(12) United States Patent
Prexl

(10) Patent No.: US 7,078,885 B2
(45) Date of Patent: Jul. 18, 2006

(54) DC-DC CMOS CONVERTER

(75) Inventor: Franz Prexl, Niederding (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/138,040

(22) Filed: May 26, 2005

(65) Prior Publication Data

US 2005/0270004 A1    Dec. 8, 2005

(51) Int. Cl.
*G05F 1/573*    (2006.01)
(52) U.S. Cl. ..................................... 323/277
(58) Field of Classification Search ................ 323/273, 323/274, 276, 277, 282, 238, 321, 315
See application file for complete search history.

(56) References Cited

U.S. PATENT DOCUMENTS

| | | | | |
|---|---|---|---|---|
| 3,500,174 A | * | 3/1970 | Ellerbeck | 323/321 |
| 5,008,586 A | * | 4/1991 | Miyazaki et al. | 323/315 |
| 6,188,211 B1 | * | 2/2001 | Rincon-Mora et al. | 323/280 |
| 6,552,517 B1 | * | 4/2003 | Ribellino et al. | 323/282 |
| 6,822,428 B1 | * | 11/2004 | Miyanaga et al. | 323/284 |

* cited by examiner

*Primary Examiner*—Adolf Berhane
(74) *Attorney, Agent, or Firm*—Abdul Zindani; W. James Brady, III; Frederick J. Telecky, Jr.

(57) ABSTRACT

A DC—DC CMOS converter including when the supply voltage is low, the current limit is automatically reduced to the maximum possible value that maintains the comparator operative, rather than simply switching off the converter.

4 Claims, 1 Drawing Sheet

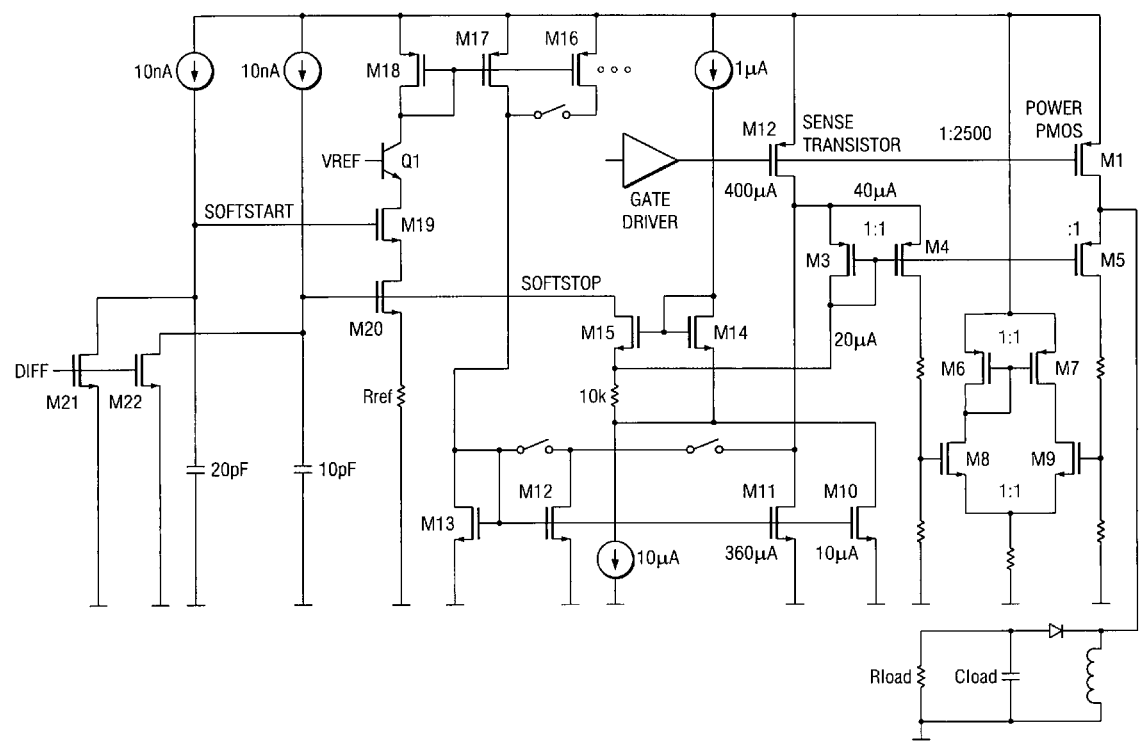

DC-DC CMOS CONVERTER

CROSS REFERENCE TO RELATED APPLICATIONS

This application claims priority under 35 USC § 119 of German Application Serial No. 10 2004 026215.2, filed May 28, 2004.

FIELD OF THE INVENTION

The present invention relates to a DC—DC CMOS converter.

BACKGROUND OF THE INVENTION

DC—DC converters usually contain an excess-current (short-circuit) protection circuit that limits the input or output current to a specified maximum value. A fast comparator is required in the excess-current protection circuit to detect the voltage drop across a sense resistor. The function of the comparator itself is dependent on a sufficient supply voltage. Conventionally, if the supply voltage drops below a normal operating level, the comparator is not operative any more, and the converter must be switched off to prevent excessive output current from damaging an appliance connected to the output of the converter even though the supply voltage, typically from a supply source such as a battery, is low.

SUMMARY OF THE INVENTION

The present invention provides a DC—DC CMOS converter wherein, when the supply voltage is low, the current limit is automatically reduced to the maximum possible value that maintains the comparator operative, rather than simply switching off the converter. As a result, the current limitation cannot fail, and operation of the converter is still possible, although at a lower output current limit.

Specifically, the invention provides a DC—DC converter with a power transistor the source of which is connected to a supply rail, the drain connected to a load cell and the gate connected to an output of a gate driver. An excess-current protection circuit includes a reference current source in series with a reference resistor between the supply rail and ground to provide a reference current, a current sense transistor with a source connected to the supply rail, a gate connected to the gate of the power transistor and a drain, and a differential amplifier comparing the voltage levels at the drain of the power transistor and at the drain of the current sense transistor, and having an output that delivers a current limit control signal. A programmable current mirror arrangement amplifies the reference current to a sense current through the current sense transistor. A soft-start circuit has a current source and a capacitor connected in series between the supply rail and ground, and a control transistor connected between the reference current source and the reference resistor and having a gate connected to the interconnection node of the current source and capacitor. A soft-stop circuit acts to reduce the voltage level at the gate of the control transistor in the soft-start circuit in response to a reduction of the sense current through the current sense transistor due to the supply voltage at the supply rail dropping below a normal operating level of the converter.

The invention makes use of the fact that a soft-start function is often required that raises the current limit after turn-on from zero to the maximum specified value within a certain time. A soft-stop function is added which interacts with existing soft-start circuitry to minimize the amount of additional circuit components.

BRIEF DESCRIPTION OF THE DRAWINGS

FIG. 1 shows a circuit diagram with preferred features of the present invention.

DETAILED DESCRIPTION OF THE DRAWINGS

With reference to the single FIGURE of the drawing, a DC—DC CMOS converter is shown which has a soft-start feature and, in addition, has a soft-stop feature. Soft-stop means that the current limit is reduced automatically to a value that can be handled by the used comparator. The well known softstart feature means that the current limit increases with a constant slope until it reaches the defined current limit value.

The term softstop has been used for two reasons. First, the circuit elements needed are similar to what has been used for the softstart realization. Second, when the battery drops to a value where the desired or programmed current limit does not work anymore, the circuit does not just turn off or stops working immediately, but it automatically ramps the current limit down to the maximum possible value and thus might keep the system alive for a longer time. In case a higher current than possible is needed, the voltage may break down a bit, but low current load situations can still work without loosing short circuit protection.

A comparator that uses a common gate input stage is shown on the right side of FIG. 1. In this case a polarity inverting buck-boost converter is shown that contains a softstart function.

Specifically, a power PMOS transistor M1 has a source connected to a supply rail V and a drain connected to a load circuit that includes an inductor L, a rectifier diode D, a charge capacitor Cload and a resistive load Rload. The gate of power transistor M1 is connected to the output of a gate driver, the input of which receives a pulse-width modulated control signal the duty cycle of which determines the average output current to the connected load circuit.

A PMOS current sense transistor M2 has its source connected to supply rail V and its gate connected to the output of the gate driver, just as power transistor M1. The current sense transistor M2 thus mirrors the current through transistor M1 divided by the amplification ratio (the ratio of the physical sizes on the chip). In the example indicated, the amplification ratio is 1:2.500, i.e. the physical size of transistor M1 is 2.500 times that of transistor M2. Accordingly, when an exemplary maximum current of 1 A flows in the channel of power transistor M1, a sense current of only 400 µA is mirrored through sense transistor M2.

Sense transistor M2 is connected in series with NMOS transistor M11 between supply rail V and ground GND. Transistor M11 mirrors an amplified reference current as will be explained. The current through series connected transistors M2 and M11 cannot exceed the amplified reference current. The comparator including transistors M6, M7 and M8, M9 with current mirror transistors M4 and M5 detects a voltage difference between the drains of sense transistor M2 and power transistor M1 to generate a shut-off signal applied to the gate driver or some other control circuitry.

From the sense current through sense transistor M2, a reduced sense current is derived with diode-connected transistor M3 and current mirror transistor M4, the reduction ratio being set so that the maximum derived sense current is 40 µA. Transistors M3 and M4 being of equal size on the die, the maximum current through each of transistors M3 and M4 is 20 µA in this example.

Transistors M21 and M22 each have a source connected to ground and a gate to which an ON/OFF control signal is applied. The drain of each transistor M21, M22 is connected to a node between a series connection of a capacitor and a current source between the supply rail and ground. The node where the drain of transistor M21 is connected provides a SOFTSTART signal to the gate of transistor M19. Transistor M19 is connected in series with bipolar npn transistor Q1, with transistor M20 and with a reference resistor Rref connected to ground, transistor Q1 having its collector connected to the drain of diode-connected transistor M18 the source of which is connected to the supply rail. A reference voltage Vref is applied to the base of transistor Q1 to determine a reference current through resistor Rref. On the side of the supply rail the reference current is mirrored by transistor M17. To modify the current amplification ratio additional transistors such as M18 can be switched in parallel with transistor M17. Transistor M17 is connected in series with diode-connected transistor M13 of opposite channel type. On the side of the ground rail, the reference current is mirrored by transistor M11. Again, to modify the current amplification ratio, additional transistors such as M12 may be switched in parallel.

The current through transistor M3 is fed through a sense resistor Rs connected to ground through a current source connected in parallel with current mirror transistor M10. Diode-connected transistor M14 has its source connected to the node between resistor Rs and transistor M10 and its drain connected to the supply rail through a current source. Transistor M15 has its source connected to the node between resistor Rs and transistor M3, its gate connected with the gate of transistor M14 and its drain connected to the gate of transistor M20 providing a SOFTSTOP signal.

The current limit is determined by the reference current Iref that is defined by VREF, resistor Rref and the current mirror ratio according to the programmed current limit value. Iref without current mirror amplification is (Vref-Vbe)/R.

Iref can flow when the signals SOFTSTART and SOFTSTOP are above VREF. Iref starts form 0 and increases linearly while SOFTSTART and SOFTSTOP signals are charged almost to the supply voltage level. Here, the comparator quiescent current is set by a constant current source and by a part of the amplified reference current. As soon as the supply (battery) voltage drops until the sense transistor current cannot flow through transistor M3 anymore, the voltage drop across the 10 k sense resistor Rs becomes smaller and M15 starts discharging the SOFTSTOP signal. The SOFTSTOP signal comes down below VREF and reduces the current limit to the value that is needed just to leave on the current through M3 and thus the comparator remains working.

This feature can be applied to any other functional block that can be programmed by a current source. The current source can be limited automatically to the maximum allowed value for any condition.

It should be understood that the various current values and amplification ratios in the figure are indicated by way of example only.

The invention claimed is:

1. A DC—DC CMOS converter comprising:
   a power transistor with a source connected to a supply rail, a drain connected to a load cell and a gate connected to an output of a gate driver;
   an excess-current protection circuit that includes
   a reference current source in series with a reference resistor between the supply rail and ground to provide a reference current,
   a current sense transistor with a source connected to the supply rail, a gate connected to the gate of the power transistor and a drain,
   a differential amplifier comparing the voltage levels at the drain of the power transistor and at the drain of the current sense transistor, and having an output that delivers a current limit control signal,
   a programmable current mirror arrangement that amplifies the reference current to a sense current through said current sense transistor,
   a soft-start circuit with a current source and a capacitor connected in series between the supply rail and ground, and a control transistor connected between the reference current source and the reference resistor and having a gate connected to the interconnection node of the current source and capacitor,
   and a soft-stop circuit that acts to reduce the voltage level at the gate of the control transistor in the soft-start circuit in response to a reduction of the sense current through said current sense transistor due to the supply voltage at the supply rail dropping below a normal operating level of the converter.

2. The converter of claim 1, wherein the control transistor in the soft-start circuit is connected in series with a bipolar transistor the base of which is connected to a reference voltage source.

3. The converter of claim 1, wherein the differential amplifier comprises a first transistor and a second transistor, the first and second transistors having their gates interconnected, the first transistor having its source connected to the drain of the current sense transistor and the second transistor having its source connected to the drain of the power transistor.

4. The converter of claim 3, wherein the first transistor is connected as a current mirror with a diode-connected transistor the source of which is connected to the drain of the current sense transistor.

* * * * *